(12) United States Patent
Lutter et al.

(10) Patent No.: US 7,000,905 B1
(45) Date of Patent: Feb. 21, 2006

(54) RETAINING KEEPER ASSEMBLY FOR A HOISTING DEVICE

(75) Inventors: Ernest E. Lutter, Sand Springs, OK (US); Alan C. Doughty, Sand Springs, OK (US); Paul A. Boeckman, Jenks, OK (US)

(73) Assignee: The Crosby Group, Inc., Tulsa, OK (US)

( * ) Notice: Subject to any disclaimer, the term of this patent is extended or adjusted under 35 U.S.C. 154(b) by 338 days.

(21) Appl. No.: 10/634,255

(22) Filed: Aug. 5, 2003

(51) Int. Cl.
*B66D 3/04* (2006.01)

(52) U.S. Cl. ...................................... 254/415; 403/344
(58) Field of Classification Search ............... 254/415; 403/118, 70, 78, 164, 165, 315–320; 294/82.1, 294/1.1
See application file for complete search history.

(56) References Cited

U.S. PATENT DOCUMENTS

| | | | | |
|---|---|---|---|---|
| 3,842,443 A | * | 10/1974 | Weber | 623/27 |
| 4,466,651 A | * | 8/1984 | Sowa et al. | 294/82.16 |
| 4,475,755 A | | 10/1984 | Patton | 294/82 |
| 4,561,797 A | * | 12/1985 | Aldridge | 403/58 |
| 4,669,907 A | | 6/1987 | Patton | 403/78 |
| 4,723,053 A | * | 2/1988 | Amaya | 174/41 |
| 5,167,661 A | * | 12/1992 | Wagenknecht | 606/54 |
| 5,393,162 A | * | 2/1995 | Nissen | 403/154 |
| 5,655,849 A | * | 8/1997 | McEwen et al. | 403/370 |
| 5,772,350 A | * | 6/1998 | Ferguson et al. | 403/78 |
| 6,491,329 B1 | * | 12/2002 | Smith | 294/1.1 |
| 6,561,723 B1 | * | 5/2003 | McCurdy et al. | 403/312 |

OTHER PUBLICATIONS

American Petroleum Institute, API Recommended Practice 8B, Seventh Edition, Mar. 2002, ANSI/API RP 8B/ISO 13534-2000.

* cited by examiner

*Primary Examiner*—Emmanuel Marcelo
(74) *Attorney, Agent, or Firm*—Head, Johnson & Kachigian

(57) ABSTRACT

A retaining keeper assembly for a hoisting device. A shank has a plurality of circumferential grooves perpendicular to an axis of the shank. A thrust bearing surrounds the shank and is supported by the hoisting device. A split retaining collar having a plurality of interior circular protrusions mates with the circumferential grooves in the shank to prevent axial movement of the shank. A cylindrical retaining collar cover having a closed top and an open bottom encloses the retaining collar, the cover having an inner diameter slightly larger than an outer diameter of the retaining collar. A fastener mechanism fastens the retaining collar cover to the split retaining collar and to the shank.

15 Claims, 3 Drawing Sheets

RETAINING KEEPER ASSEMBLY FOR A HOISTING DEVICE

BACKGROUND OF THE INVENTION

1. Field of the Invention

The present invention relates to a retaining keeper assembly for a hoisting device. In particular, the present invention relates to a retaining keeper assembly for a pulley block that will accommodate rotating swivel action and be sealed from the elements while also permitting easy disassembly and reassembly.

2. Prior Art

In various types of industrial hoisting devices, it is necessary and desirable to swivel or rotate a load receiving member such as a hook, shackle or the like, with a hoisting portion, such as a pulley block. Examples of prior assemblies in hoisting devices are shown in Assignee's U.S. Pat. No. 4,669,907 entitled "Industrial Swivel" and U.S. Pat. No. 4,475,755 entitled "Apparatus And Method For Assembly-Disassembly of A Spring Loaded Hook". The assembly of the device may include seals, gaskets and packings. Various parts of the assembly are subject to wear over time and must be replaced. The various parts of the assembly should also be inspected from time to time in order to observe wear and to assure that the parts are in working order. For example, API (American Petroleum Institute) Recommended Practice 8B requires the periodic inspection at specific times of hoisting devices including disassembly to inspect specific components.

Accordingly, it is an object and purpose of the present invention to provide a retaining keeper assembly for a hoisting device wherein the components may be easily disassembled and accessed for inspection and replacement.

In the case of certain hoisting devices which are used in extreme environments, such as oilfield equipment, the equipment is subjected to dust, dirt, corrosive environments, and extreme hot and cold conditions, and the swivel mechanism should be protected against all of these conditions and the elements.

Accordingly, it is an object and purpose of the present invention to provide a retaining keeper assembly for a hoisting device that will be sealed.

It is a further object and purpose of the present invention to provide a retaining keeper assembly for a hoisting device which will maintain a fluid tight seal.

While there are many different designs for hoisting devices, some designs, such as various pulley blocks and block cases, provide limited space in order to access the individual components. Assembly and disassembly is, thus, made difficult.

Accordingly, it is an object and purpose of the present invention to provide a retaining keeper assembly for a hoisting device wherein components may be easily accessed in limited space conditions.

It is a further object and purpose of the present invention to provide a retaining keeper assembly for a hoisting device that may be retrofit to existing hoisting devices.

SUMMARY OF THE INVENTION

The present invention is directed to a retaining keeper assembly for a hoisting device, such as a pulley block.

In the present embodiment, the hoisting device includes a lower block case having a cylindrical recessed opening for receipt of a shank.

A shank supporting a load carrying member, such as a hook, terminates in an end having a plurality of parallel circumferential grooves or recesses in the shank. Each of the grooves is perpendicular to an axis of the shank. The shank passes through the circular cylindrical opening in the lower block case. A thrust bearing fits over and surrounds the shank below the level of the circumferential grooves and is supported in the cylindrical recess of the lower block case. The thrust bearing accommodates rotational or swivel movement between the lower block and the shank.

The retaining keeper assembly includes a split retaining collar fashioned from a pair of semi-circular halves. When the halves are brought together, they form a cylindrical collar having a plurality of interior circular protrusions. The interior circular protrusions mate with the grooves in the shank. The collar rests on the thrust bearing so that the collar prevents axial movement of the shank. Load force passes from the hook to the retaining collar, through the thrust bearing and then to the case.

A cylindrical retaining collar cover has cylindrical walls, a closed top and an open bottom. The cylindrical walls of the retaining collar cover have an inner diameter which closely fit the outer diameter of the retaining collar when the collar halves are brought together around the shank. The retaining collar cover entirely surrounds the retaining collar halves and also keeps them from separating.

The retaining keeper assembly also includes a fastener mechanism in order to removably fasten the retaining collar cover to the collar and to the shank. A pair of fasteners passes through openings in the retaining collar cover and engages threaded openings in the retaining collar halves. A pair of fasteners pass through openings in the retaining collar cover and engages threaded openings in the end of the shank.

A flexible circular seal has an inner diameter which mates with the exterior of the retaining collar cover and an outer diameter which mates with the cylindrical recess of the lower block case, thereby forming a fluid tight seal.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
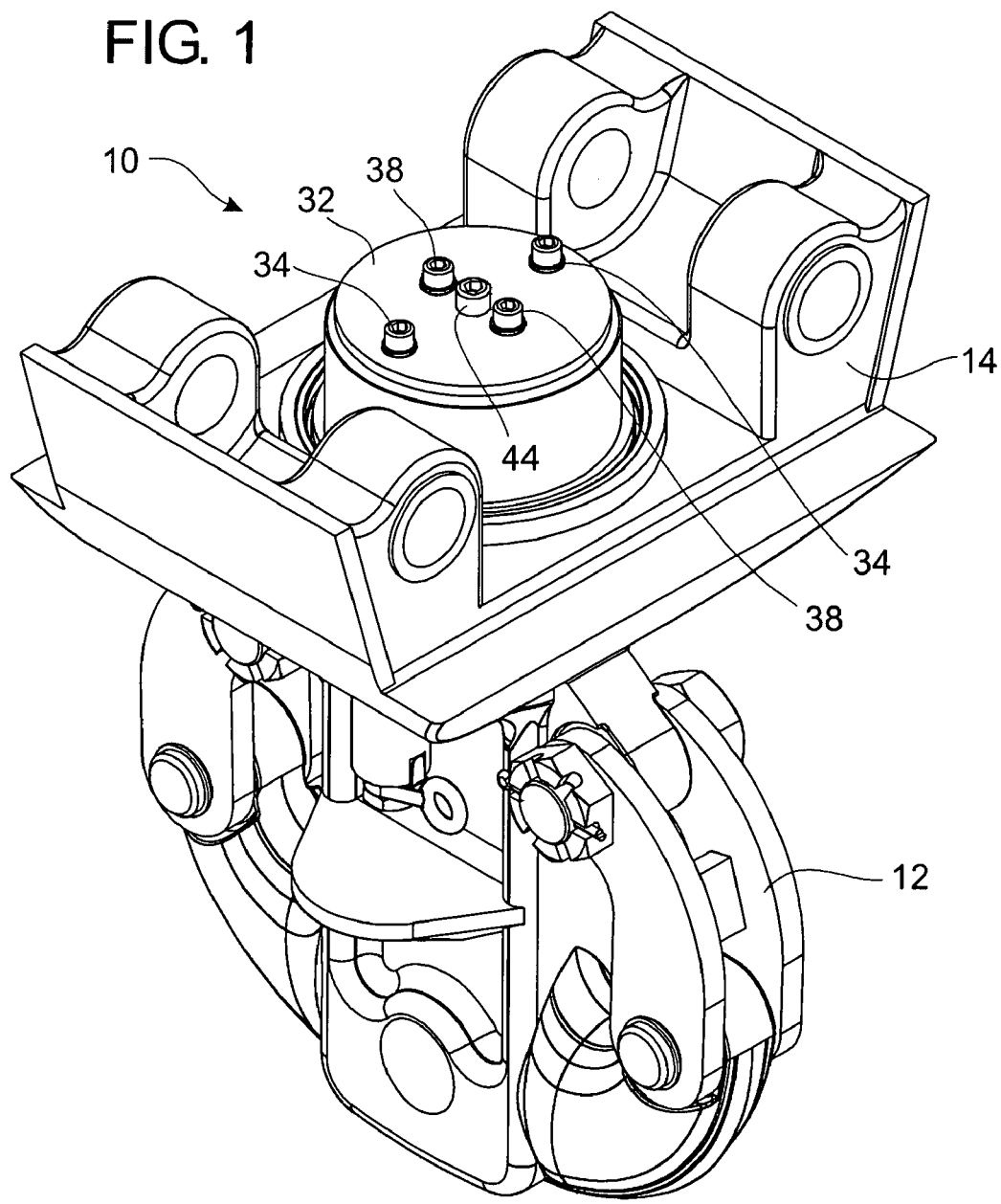
FIG. 1 is a perspective view of a retaining keeper assembly for a hoisting device constructed in accordance with the present invention with a portion of the hoisting device removed for ease of viewing.

Referring to the drawings in detail, FIG. 1 is a perspective view of a retaining keeper assembly 10 shown in use with a hoisting device. In a preferred embodiment of the present invention displayed, a tubing block with a hook 12 used for oilfield tubing applications is shown. It will be appreciated that other types of hooks, shackles or lifting devices might be employed within the spirit and scope of the present invention.

The hook 12 is designed to permit rotation or swivel movement between it and a hoisting device. The hoisting device may take many forms, such as a pulley block having sheaves and an upper and lower case. Lower block case 14 is shown in FIG. 1 with the balance of the pulley block removed for ease of viewing.

Figure 2:
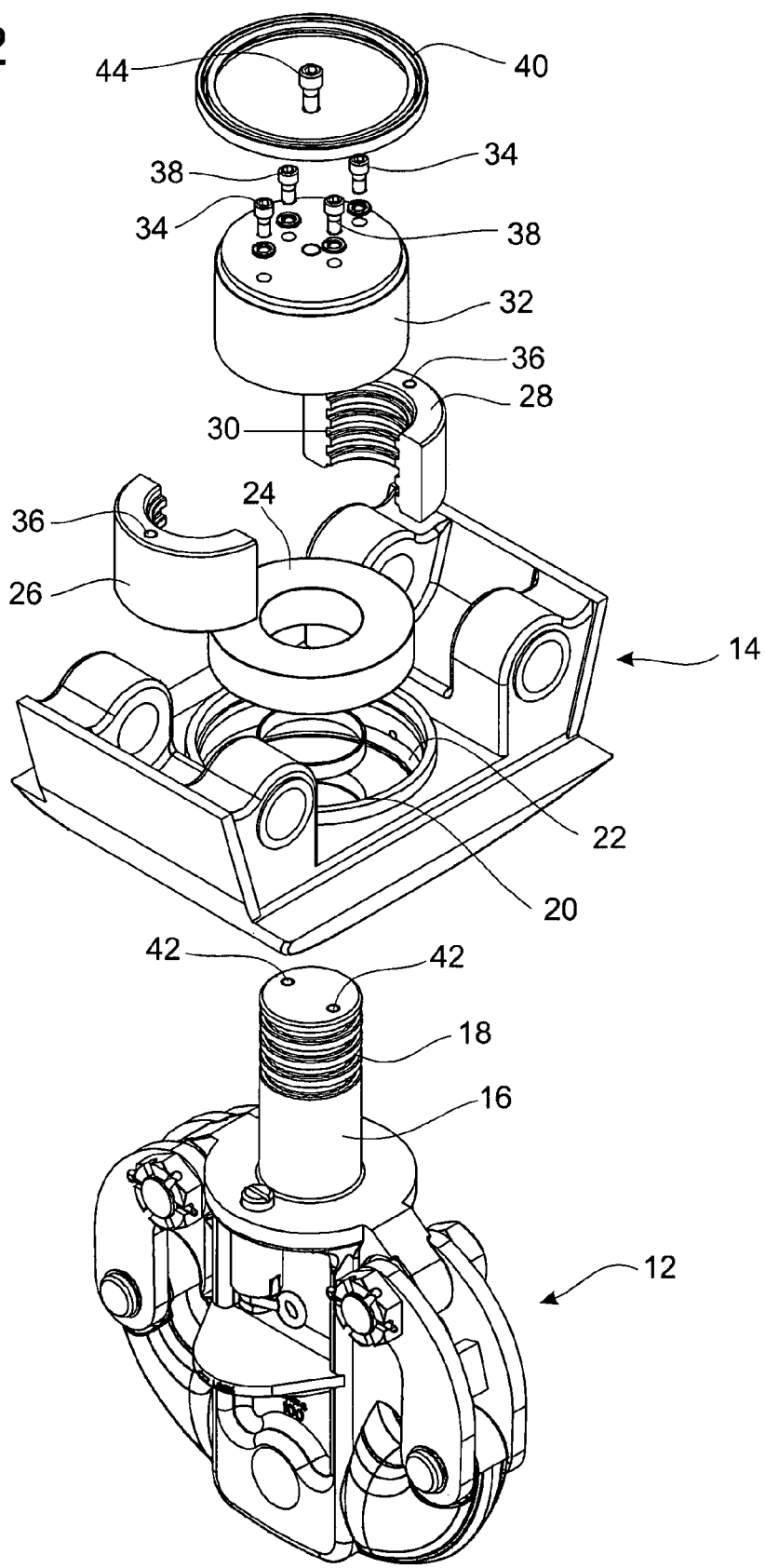
FIG. 2 is an exploded view of a retaining keeper assembly for a hoisting device as shown in FIG. 1.

FIG. 2 illustrates an exploded view of the retaining keeper assembly 10 so that the various elements or components are visible.

A shank 16 extends from the hook 12. The shank 16 terminates in an end having a plurality of parallel circumferential grooves 18 or recesses in the shank, each of the grooves being perpendicular to an axis of the shank 16.

The shank 16 passes through a circular opening 20 in the lower block case 14. The lower block case includes a cylindrical recess into which is received a circular thrust bearing 24. When installed, the circular thrust bearing 24 fits over and surrounds the shank 16 below the level of the grooves 18. The thrust bearing 24 accommodates rotational or swivel movement between the lower block case 14 and the shank 16.

The retaining keeper assembly 10 also includes a split retaining collar fashioned from a pair of semi-circular halves 26 and 28. The retaining collar halves 26 and 28 are brought together to form a cylindrical collar having a plurality of interior circular protrusions 30. The interior circular protrusions mate with the grooves 18 in the shank 16. A base of the retaining collar rests on and is supported by the thrust bearing. The collar, thus, prevents axial movement of said shaft. Grease or lubricant may be inserted between the grooves 18 and the protrusions of the collar, although the collar and shank move together once assembled.

A cylindrical retaining collar cover 32 has cylindrical walls, a closed top and an open bottom. The cylindrical retaining collar cover 32 has an inner diameter slightly larger than the outer diameter of the retaining collar when the collar halves 26 and 28 are brought together around the shank 16. When assembled as shown in FIG. 1, the retaining collar cover 32 entirely surrounds the retaining collar halves 26 and 28 and also keeps them from separating.

The retaining keeper assembly 10 also includes a fastener mechanism in order to removably fasten the retaining collar cover 32 to the collar and to the shank 16. A pair of fasteners in the form of threaded bolts 34 pass through openings in the retaining collar cover 32 and engage threaded openings 36 in the retaining collar halves 26 and 28. A pair of fasteners in the form of threaded bolts 38 pass through openings in the retaining collar cover 32 and engage threaded openings 42 in the shank 16. Rotational movement of the shank, thus, causes rotational movement of the split retaining collar and the retaining collar cover.

A flexible circular seal 40 has an inner edge which mates with the exterior cylindrical walls of the retaining collar cover 32. The circular seal also has an outer edge which will mate with the cylindrical recess 22 of the lower block case 14. Accordingly, when the circular seal 40 is in place, it creates a fluid tight seal between the retaining collar cover and the block case 14.

An optional cap bolt 44 may be inserted in a center opening through the top of the retaining collar cover 32. Once the other fasteners 34 and 38 have been removed and the seal 40 removed, the cap bolt 44 may be used by rotating in a clockwise direction to force the retaining collar cover away from the top of the shank. The cap bolt, thus, will assist in disassembly of the retaining keeper assembly.

Figure 3:
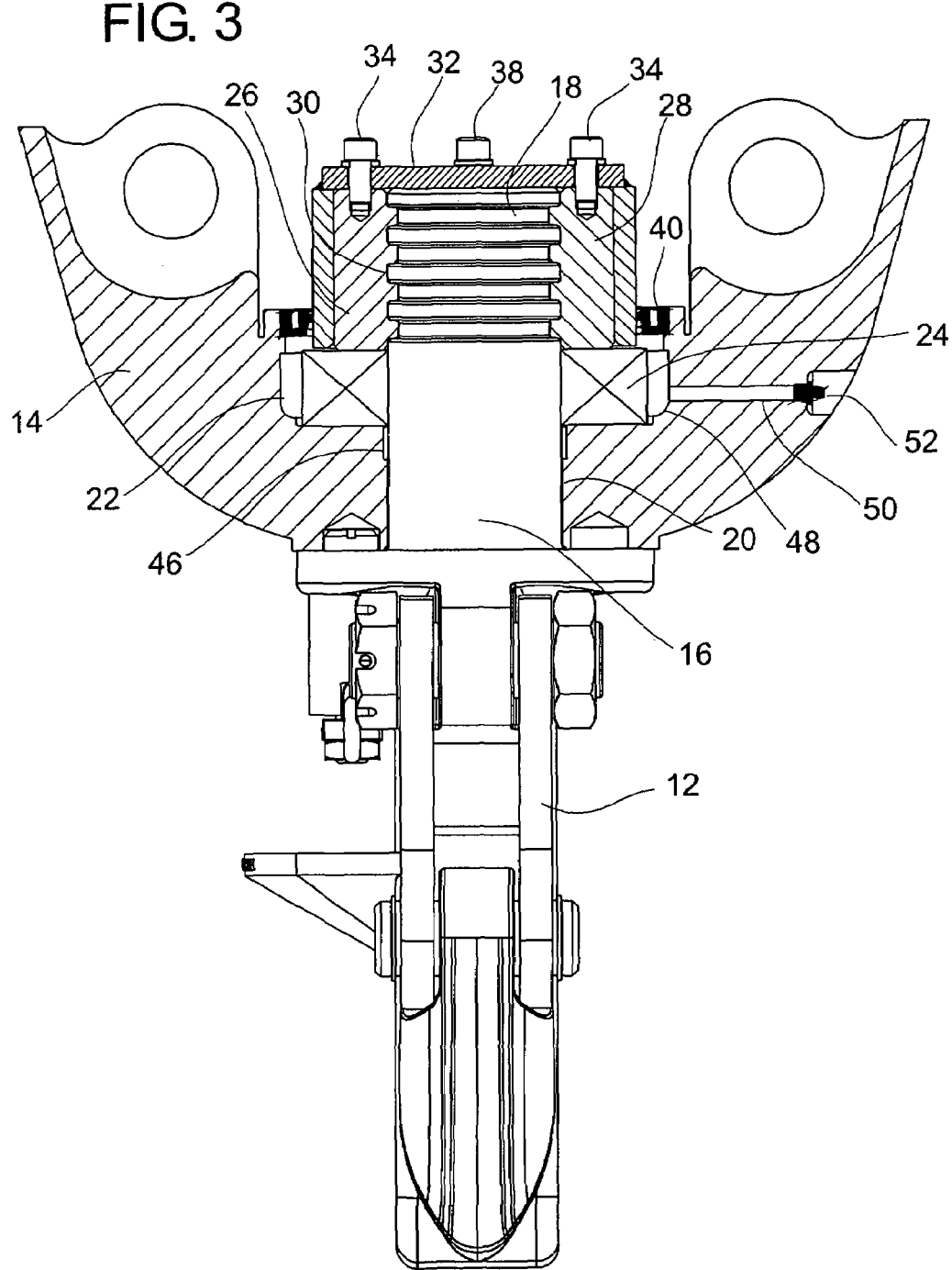
FIG. 3 is a partial sectional view of the retaining keeper assembly shown in FIG. 1.

FIG. 3 illustrates a partial sectional view of the retaining keeper assembly as shown in assembled condition in FIG. 1. A bushing 46 may be juxtaposed between the shank 16 and the lower block case 14 below the thrust bearing. The thrust bearing 24 resides in the cylindrical recess in the lower case. A circular cavity 48 is connected to a passageway 50 terminating in a grease zerk 52 so that grease may be supplied to the thrust bearing 24 as it interfaces between the block case 14 and the shank 16. The split retaining collar rests on and is supported on the thrust bearing. It will be observed that the collar, retaining collar cover and shank are fastened together and move together. The circular seal ring 40 on the outside of the cover creates a fluid tight seal.

In order to install the retaining keeper assembly 10 initially, the thrust bearing 24 is inserted into the cylindrical recess of the lower block case 14. Thereafter, the shank 16 of the hook is inserted through the cylindrical opening in the lower block case 14 and through the thrust bearing. The circular grooves 18 will then be visible extending from the case 14. The split retaining collar will be installed by bringing the halves together around the shank 16 so that the interior circular protrusions of the retaining collar mate with the grooves of the shank. Thereafter, the open end of the cylindrical retaining collar cover 32 is slid over top of the split retaining collar and over top of the end of the shank 16. The retaining collar cover 32 is secured to the retaining collar with fasteners and the retaining collar cover is secured to the shank with fasteners. A cap bolt or other cover may be installed in the top opening to keep it in closed position. Finally, the circular seal 40 is brought over top of the retaining collar cover and into the recess of the block case so that a fluid tight seal is created between the exterior of the retaining collar cover and the block case.

The foregoing procedure is performed in reverse in order to disassemble the retaining keeper assembly 10. The retaining keeper assembly may be easily assembled and easily disassembled for maintenance and repair.

Whereas, the present invention has been described in relation to the drawings attached hereto, it should be understood that other and further modifications, apart from those shown or suggested herein, may be made within the spirit and scope of this invention.

What is claimed is:

1. A retaining keeper assembly for a hoisting device, which assembly comprises:

a shank having a plurality of circumferential grooves perpendicular to an axis of said shank;

a thrust bearing surrounding said shank and supported by said hoisting device;

a split retaining collar having a plurality of interior circular protrusions which mate with said circumferential grooves in said shank;

a cylindrical retaining collar cover having a closed top and an open bottom, said retaining collar cover having an inner diameter slightly larger than an outer diameter of said retaining collar; and a fastener mechanism to fasten said retaining collar cover to said split retaining collar.

2. A retaining keeper assembly as set forth in claim 1 wherein said hoisting device is a pulley block having a cylindrical recess with a diameter slightly greater than said retaining collar cover.

3. A retaining keeper assembly as set forth in claim 2 including a circular seal between said retaining collar cover and said cylindrical recess of said pulley block to create a liquid tight seal.

4. A retaining keeper assembly as set forth in claim 1 including a circular seal between said retaining collar cover and said hoisting device to create a liquid tight seal.

5. A retaining keeper assembly as set forth in claim 1 including a bushing juxtaposed between said hoisting device and said shank below said thrust bearing.

6. A retaining keeper assembly as set forth in claim 1 wherein said fastener mechanism includes a plurality of threaded screws received through a plurality of openings in said top of said retaining collar cover wherein said screws are received in threaded openings in said split retaining collar.

7. A retaining keeper assembly as set forth in claim 1 including a fastener between said cover and said shank.

8. A retaining keeper assembly as set forth in claim 1 wherein said split retaining collar is a pair of semi-circular halves.

9. A retaining keeper assembly as set forth in claim 1 wherein said shank supports a hook or hooks.

10. A retaining keeper assembly as set forth in claim 1 wherein said shank supports a swivel.

11. A method of installing a retaining keeper assembly for a hoisting device wherein such method comprises:

installing a thrust bearing surrounding a shank supported against said hoisting device;

installing a shank having a plurality of circumferential grooves in said hoisting device wherein said grooves are perpendicular to an axis of said shank;

installing a split retaining collar having a plurality of interior circular protrusions around said grooves of said shank;

sliding a cylindrical retaining collar cover over said split retaining collar and said shank;

securing said retaining collar cover to said collar and shank; and installing a circular seal over said retaining collar cover between said cap and said device.

12. A method as set forth in claim 11 wherein said split retaining collar is split into a pair of semi-circular halves.

13. A method as set forth in claim 11 wherein said cylindrical retaining collar cover has an open bottom and a closed top.

14. A method as set forth in claim 11 wherein said step of securing said cap to said shank includes fastening threaded bolts through openings through said cover and into said cover.

15. A method as set forth in claim 11 wherein the steps are performed in reverse order to disassemble the retaining keeper assembly.

\* \* \* \* \*